(12) United States Patent
Denker et al.

(10) Patent No.: US 11,263,339 B2
(45) Date of Patent: Mar. 1, 2022

(54) DATA ACCESS CONTROL SYSTEM WITH A DECLARATIVE POLICY FRAMEWORK

(71) Applicant: SRI International, Menlo Park, CA (US)

(72) Inventors: Grit Denker, Palo Alto, CA (US); Karsten Martiny, Milbrae, CA (US); Daniel Elenius, Redwood City, CA (US)

(73) Assignee: SRI International, Menlo Park, CA (US)

( * ) Notice: Subject to any disclaimer, the term of this patent is extended or adjusted under 35 U.S.C. 154(b) by 218 days.

(21) Appl. No.: 16/560,930

(22) Filed: Sep. 4, 2019

(65) Prior Publication Data
US 2020/0401719 A1 Dec. 24, 2020

Related U.S. Application Data

(60) Provisional application No. 62/783,784, filed on Dec. 21, 2018.

(51) Int. Cl.
*G06F 21/62* (2013.01)
(52) U.S. Cl.
CPC .................. *G06F 21/6227* (2013.01)
(58) Field of Classification Search
CPC .................................................. G06F 21/6227
See application file for complete search history.

(56) References Cited

U.S. PATENT DOCUMENTS

| | | | |
|---|---|---|---|
| 2011/0154209 A1* | 6/2011 | Fan | G06F 16/9535 715/736 |
| 2013/0117202 A1* | 5/2013 | Malka | G06F 16/215 706/12 |
| 2013/0117219 A1* | 5/2013 | Malka | G06F 16/215 707/603 |
| 2015/0178135 A1* | 6/2015 | Wang | H04L 45/021 718/104 |

(Continued)

OTHER PUBLICATIONS

Agrawal et al., "Theory and Applications of Models of Computation," 5th International Conference, TAMC 2008, Apr. 25-29, 2008, 610 pp.

(Continued)

*Primary Examiner* — Eliyah S. Harper
(74) *Attorney, Agent, or Firm* — Shumaker & Sieffert, P.A.

(57) ABSTRACT

In general, techniques for data access control are described, in which a policy engine implements and applies a declarative policy framework that can represent and reason about complex privacy policies. By using a common data model together with a formal shareability theory, this declarative policy framework enables the specification of expressive policies in a concise way without burdening the user with technical details of the underlying formalism of a data querying application or other knowledge representation scheme. The policy engine may be deployed as the policy decision point in a data access control system that also includes a policy enforcement point. The policy engine includes user interfaces for the creation, validation, and management of privacy policies. The policy engine may interface with systems that manage data requests and replies by coordinating policy engine decisions and access to databases.

20 Claims, 5 Drawing Sheets

(56) References Cited

U.S. PATENT DOCUMENTS

2019/0205395 A1* 7/2019 Bonin ................ G06F 16/345

OTHER PUBLICATIONS

Archer et al., "Maturity and Performance of Programmable Secure Computation," Oct. 27, 2016, 26 pp.
Ashley et al., "Enterprise Privacy Authorization Language (EPAL)," ResearchGate, Research Report, Mar. 3, 2003, 70 pp.
Ashley et al., "The Enterprise Privacy Authorization Language (EPAL)—How to Enforce Privacy throughout an Enterprise," accessed from https://www.w3.org/2003/p3p-ws/pp/ibm3.html, retrieved on Aug. 3, 2020, 6 pp.
Becker et al., "Design and Semantics of a Decentralized Authorization Language," Digital Identity Management (DIM 2007), Journal of Computer Security, vol. 18, No. 4, Jun. 1, 2010, 13 pp.
Briesemeister et al., "Policy Creation for Enterprise-Level Data Sharing," In Proceedings of Human-Computer Interaction International 2019 Conference, Jun. 12, 2019, 12 pp.
Carminati et al., "A Framework to Enforce Access Control over Data Streams," ACM Transactions on Information and System Security, vol. 13, No. 3, Article 28, Jul. 2010, 31 pp.
Carminati et al., "Specifying Access Control Policies on Data Streams," DASFAA'07: Proceedings of the 12th international conference on Database systems for advanced applications, Apr. 2007, 12 pp.
Damianou et al., "The Ponder Policy Specification Language," Proc. Policy 2001: Workshop on Policies for Distributed Systems and Networks, Jan. 29-31, 2001, 21 pp.
Dinh et al., "Streamforce: Outsourcing Access Control Enforcement for Stream Data to the Clouds," accessed from Cornell University, arXiv:1305.6146v2, May 28, 2013, 28 pp.
Elenius et al., "Semantically Enhanced Virtual Learning Environments Using Sunflower," Springer International, Publishing, available online Nov. 4, 2016, 13 pp.
Ford et al., "Automating Financial Regulatory Compliance Using Ontology+Rules and Sunflower," Semantics, Sep. 2016, 8 pp.
Kagal et al., "A Policy Language for a Pervasive Computing Environment," Proceedings of the 4th IEEE International Workshop on Policies for Distributed Systems and Networks, Jun. 2003, 12 pp.
Kifer et al., "ERGO (aka Flora-2): User's Manual," Oct. 13, 2018, 338 pp.
Martiny et al., "Protecting Privacy with a Declarative Policy Framework," 2018 IEEE 12th International Conference on Semantic Computing (ICSC), Jan. 31-Feb. 2, 2018, 8 pp.
Mun et al., "Personal Data Vaults: A Locus of Control for Personal Data Streams," ACM, Nov. 30-Dec. 3, 2010, 12 pp.
Nehme et al., "FENCE: Continuous Access Control Enforcement in Dynamic Data Stream Environments," IDCE Conference 2010, 2010, 4 pp.
Oasis "extensible Access Control Markup Language (XACML) Version 3.0," OASIS Standard, Jan. 22, 2013, 154 pp.
SRI International, "Sunflower User Manual—Overview," accessed from https://sunflower.csl.sri.eom/docs/1.0-SNAPSHOT/sunflower-manual/overview/overview.html, 2015, 5 pp.
St. John et al., "Enterprise-Level Private Data Sharing: Framework and User Interface Concepts," Poster presentation and Abstract, AHFE International, Jul. 21-25, 2018, 2 pp.
Sweeney, "Simple Demographics Often Identify People Uniquely," Data Privacy Working Paper 3, posted Jan. 1, 2000, 34 pp.
Thoma et al., "CryptStream: Cryptographic Access Controls for Streaming Data," CODASPY' 15, Mar. 2-4, 2015, 3 pp.
Uszok et al., "KAoS: A Policy and Domain Services Framework for Grid Computing and Semantic Web Services," Lecture Notes in Computer Science, Mar. 2004, uploaded to ResearchGate Aug. 26, 2016, 11 pp.
Dwork et al., "Differential Privacy: A Survey of Results," "Theory and Applications of Models of Computation," 5th International Conference, TAMC 2008, Apr. 25-29, 2008, Springer-Verlag, 19 pp.
Styra, "Policy-based control for cloud native environments," retrieved from https://www.openpolicyagent.org/ on Nov. 11, 2020, 10 pp.
Kagal et al., "Using Dependency Tracking to Provide Explanations for Policy Management," 2008 IEEE Workshop on Policies for Distributed Systems and Networks, Jun. 2008, 8 pp.

* cited by examiner

DATA ACCESS CONTROL SYSTEM WITH A DECLARATIVE POLICY FRAMEWORK

This application claims the benefit of Provisional Application 62/783,784, filed Dec. 21, 2018, the entire contents of which is hereby incorporated by reference.

GOVERNMENT RIGHTS

This invention was made with Government support under contract number N66001-15-C-4069 awarded by Space and Naval Warfare Systems Center Pacific. The Government has certain rights in the invention.

TECHNICAL FIELD

This disclosure relates to data access control and, more specifically, to policy enforcement for data access control.

BACKGROUND

Computer networks can be used to transmit digital data from one computer to another across entity boundaries. As such, computer networks are vulnerable to security breaches through which entities can gain unauthorized access to sensitive data, such as personally identifiable data or classified information. Rules for protecting digital data from unauthorized exposure can be encoded in machine readable form and enforced using computer software.

SUMMARY

In general, techniques for data access control are described, in which a policy engine implements and applies a declarative policy framework that can represent and reason about complex privacy policies. By using a common data model together with a formal shareability theory, this declarative policy framework enables the specification of expressive policies in a concise way without burdening the user with technical details of the underlying formalism of a data querying application or other knowledge representation scheme. The policy engine may be deployed as the policy decision point in a data access control system that also includes a policy enforcement point. The policy engine includes user interfaces for the creation, validation, and management of privacy policies. The policy engine may interface with systems that manage data requests and replies by coordinating policy engine decisions and access to databases.

The techniques may provide one or more technical advantages that provide at least one practical application. For example, fully capturing a policy authority's intent in a formal specification usually leads to large sets of complex policies. Thus, the task of creating privacy policies is time consuming and error prone and is inaccessible to users without experience in formal knowledge representations. The declarative policy framework described herein solves this problem by specifying policy objects based on an ontology. Together with a general shareability theory, the framework provides an ability to users to specify expressive data access policies in a concise way and facilitates the development of intuitive user interfaces. In addition, or alternatively, policy authors use the domain-specific ontology together with an axiomatic characterization of general background knowledge, and a general, domain-independent shareability theory. This allows the policy engine to generalize to a high degree, with one policy covering many types of requests. In turn, it allows the policy author to write expressive policies in a concise way, capturing their intent without requiring extensive knowledge of the underlying specification formalism.

In some examples, a method of controlling access to data comprises storing, by a policy engine, one or more policy rules, wherein each policy rule of the one or more policy rules, by reference to at least one class and/or at least one property of one or more classes of a common data model, specifies a corresponding data set within data stored to a data system and specifies whether the corresponding data set is shareable or is not shareable, wherein the common data model defines a knowledge structure for a domain of knowledge of the data stored to the data system; receiving, by a policy engine, a data request to access a requested data set stored to the data system, wherein the data request specifies the requested data set using at least one class and/or at least one property of the one or more classes of the common data model; applying, by the policy engine, a shareability model to the one or more policy rules to determine a matching policy rule of the one or more policy rules in which at least some of the requested data set is entailed by the corresponding data set specified by the matching policy rule, wherein the shareability model includes one or more axioms that each specifies the shareability of a class or property in relation to another class or property; and based on the matching policy rule, by the policy engine, outputting a data sharing decision for the data request that indicates whether the at least some of the requested data set is shareable or is not shareable.

In some examples, a computing system comprises one or more policy rules, wherein each policy rule of the one or more policy rules, by reference to at least one class and/or at least one property of one or more classes of a common data model, specifies a corresponding data set within data stored to a data system and specifies whether the corresponding data set is shareable or is not shareable, wherein the common data model defines a knowledge structure for a domain of knowledge of the data stored to the data system; a policy engine comprising processing circuitry coupled to a memory storing instructions, wherein the policy engine is configured to receive a data request to access a requested data set stored to the data system, wherein the data request specifies the requested data set using at least one class and/or at least one property of the one or more classes of the common data model, wherein the policy engine is configured to apply a shareability model to the one or more policy rules to determine a matching policy rule of the one or more policy rules in which at least some of the requested data set is entailed by the corresponding data set specified by the matching policy rule, wherein the shareability model includes one or more axioms that each specifies the shareability of a class or property in relation to another class or property and wherein the policy engine is configured to, based on the matching policy rule, output a data sharing decision for the data request that indicates whether the at least some of the requested data set is shareable or is not shareable.

In some examples, a non-transitory computer-readable storage medium comprises instructions which, when executed by one or more processors, cause a computing system to perform operations comprising storing one or more policy rules, wherein each policy rule of the one or more policy rules, by reference to at least one class and/or at least one property of one or more classes of a common data model, specifies a corresponding data set within data stored to a data system and specifies whether the corresponding data set is shareable or is not shareable, wherein the common data model defines a knowledge structure for a domain of knowledge of the data stored to the data system; receiving a data request to access a requested data set stored to the data system, wherein the data request specifies the requested data set using at least one class and/or at least one property of the one or more classes of the common data model; applying a shareability model to the one or more policy rules to determine a matching policy rule of the one or more policy rules in which at least some of the requested data set is entailed by the corresponding data set specified by the matching policy rule, wherein the shareability model includes one or more axioms that each specifies the shareability of a class or property in relation to another class or property; and based on the matching policy rule, outputting a data sharing decision for the data request that indicates whether the at least some of the requested data set is shareable or is not shareable.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1:
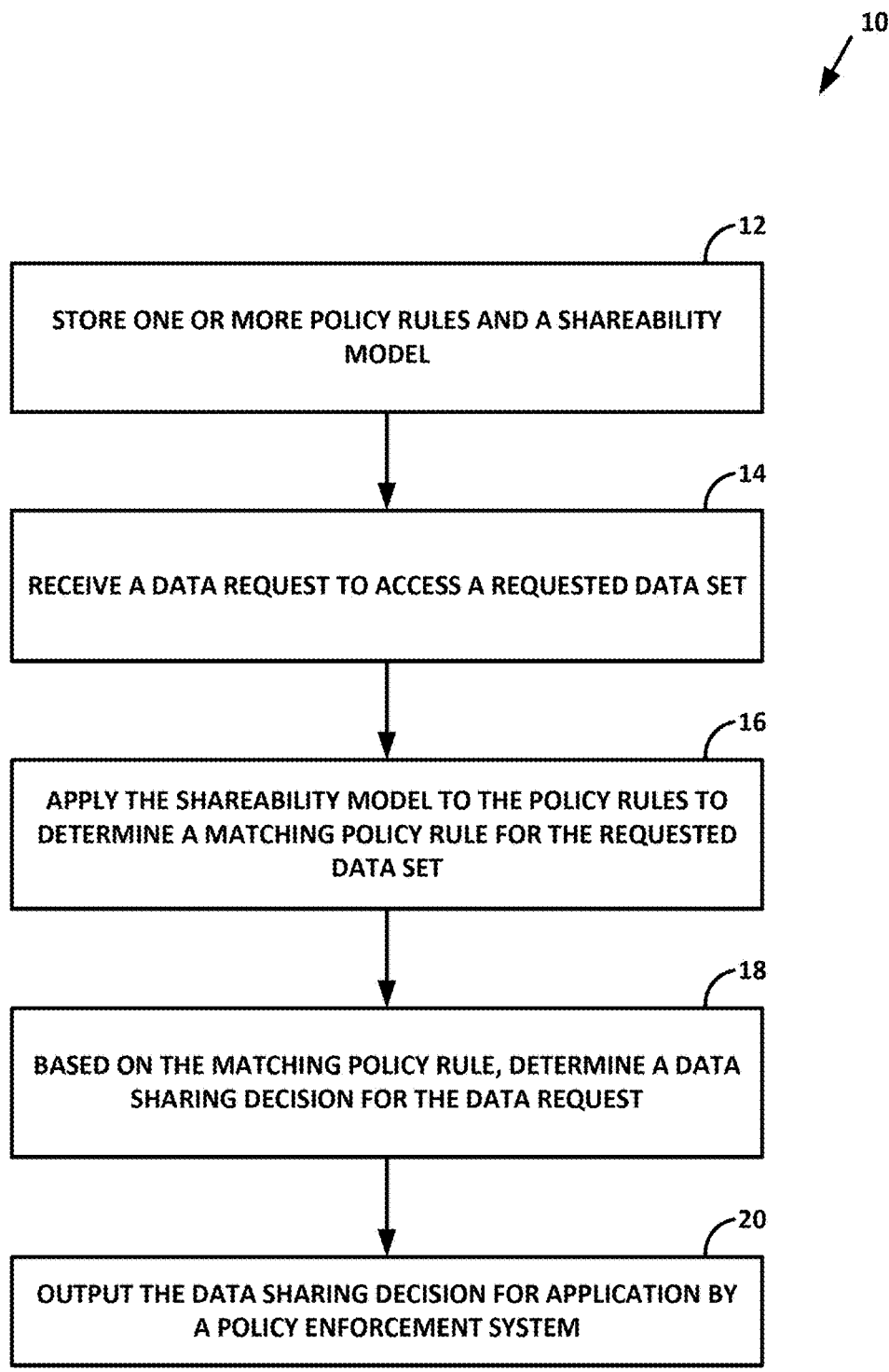
FIG. 1 is flowchart illustrating an example mode of operation for a policy engine of a policy decision point, according to techniques described in this disclosure.

Technological advances have greatly expanded network communication capabilities and enabled the miniaturization of powerful computing devices. These developments also have facilitated the incorporation of network connectivity and computerized intelligence into many traditionally non-intelligent devices. Each or any of these networked devices potentially can access data stored on other networked devices or collect and store data that can be accessed by other networked devices.

As network connectivity is added to more and more devices, sensitive information increasingly is at risk of exposure. At the same time, the data privacy risks may not be well understood or appreciated by those who request data, and those risks may not be fully addressed by the software or systems that are designed to control access to the data. Thus, security breaches can result from seemingly innocent or inadvertent behaviors just as well as malicious attacks.

For example, granting access to a triple of gender, zip code, and birth date uniquely can identify most individuals in the United States. However, granting access to any one of these values only in isolation reveals little. Thus, controlling how data values may be combined and shared is a desirable feature of technologies that are used to control data sharing.

Differential privacy (DP) techniques have been implemented on computers to limit access to sensitive information when access is granted to stored data. DP techniques have been effective for simple queries. For example, DP can be useful for counting queries in which a requester wishes to know how the majority of users responded to a survey question. Omission of a single user's response is unlikely to affect conclusions that may be drawn from the retrieved data.

However, DP techniques are much harder to apply to more complex queries. For example, the DP-modulated results of an income summing or minimum-maximum query could be greatly misleading or inaccurate if a single value is omitted. Moreover, DP techniques do not deal well with the possibility of adaptive querying, in which a data requester may issue a first query, and then a follow-up query, and so on, where, after several iterations the requester may be able to discern and break the DP technique.

Prior semantic technologies may use ontologies to capture data sources, but not to capture system dynamics, behavior, or policies. The disclosed technologies combine an ontology with rules in a way that enables the full power of semantic technologies to be used as a basis for implementing data access control applications and systems that can grow and adapt to underlying user needs and/or system requirements.

Techniques described in this disclosure provide automated mechanisms that can facilitate both the creation of robust data protection policies and the reliable application of those policies at runtime, including in both simple and complex query scenarios. For example, a policy engine described herein uses policy rules, expressed in terms of a common data model, and a shareability model in combination to generate and output data sharing decisions for data requests to access data stored to a data system. In general, a policy rule defines and applies to a corresponding data set within the data stored to a data system and specifies whether that data set is shareable or is not shareable.

Existing technologies for creating ontologies, such as Web Ontology Language (OWL), and rule languages, like Semantic Web Rule Language (SWRL), and standardization efforts, like the Rule Interchange Format (RIF), do not support many of the features that are required for real-world data access control applications. For example, SWRL has no negation and does not support n-ary predicates, aggregation or higher order expressions, structured output (such as CSV or XML), database interface, or tracing or debugging of reasoning with rules. SWRL also does not support procedural attachments, provide human-readable source code, or include satisfactory rule-editing tools.

Aspects of the disclosed technologies address the shortcomings of these and other existing tools. The disclosed technologies support automated reasoning applications, can be applied to a broad variety of domains, and are especially well-suited to situations posing the needs to automatically reason about complex data, integrate heterogeneous knowledge, and solve problems with complex, interdependent constraints.

The disclosed technologies are not limited to the above advantages. Other advantages may be realized by any one or more aspects of the disclosed technologies.

FIG. 1 is flowchart illustrating an example mode of operation for a policy engine of a policy decision point, according to techniques described in this disclosure. While described with reference to policy engine 62 of FIG. 2, any policy engine described herein may apply mode of operation 10. Mode of operation 10 may be implemented in software, hardware, or a combination of software and hardware.

Aspects of mode of operation 10 may be embodied in computer program code schematically depicted in FIG. 2 as a number of software-based components as described below. The software-based component(s) in which mode of operation 10 is embodied are executable by processor(s) such as those of computing device(s) 110, 140, 142 shown in FIG. 3, described below.

Policy engine 62 stores, locally or on a remote server accessible to policy engine 62, one or more policy rules and a shareability model (12). Each of the policy rules references at least one class and/or at least one property of one or more classes of a common data model in order to specify a corresponding data set within data stored to a data system. That is, one or more classes, one or more properties of classes, or one or more classes and one or more properties of classes. The common data model defines a knowledge structure for a domain of knowledge of the data stored to the data system. Each of the policy rules also specifies whether the corresponding data set is shareable or is not shareable.

A policy rule may be expressed using a Request Formula (RF) or a Joint Data Set (JDS). An RF may be defined using the Flora language using a Flora formula, which may contain a conjunction of subject-property-object triples. The concept of Request Formula is used in the declarative policy framework to specify (i) what data is requested in a specific request, as well as (ii) what data is affected (allowed or disallowed) by a policy rule. In other words, each data request may include an RF to specify the data set being requested, and each policy rule may include an RF to specify the corresponding data set matched by the policy rule.

In accordance with techniques described in this disclosure, policy engine 62 applies a shareability model 58 to policy rules 56 to facilitate a more flexible relationship between requested data sets and policy rules 56. In this case, policy engine 62 applies shareability model 58 to policy rules 56 to determine a matching policy rule in policy rules 56, for which at least some of the requested data set specified in data request 60 is entailed by the corresponding data set specified by the matching policy rule when the shareability model 58 is applied (16).

In general, a policy author may intend to specify policies that capture a large variety of property combinations. It some cases, however, it does not suffice to determine whether the requested data set specified by a request formula in a data request exactly matches the request formulas in the policy rules. Expecting separate specifications for every relevant combination of properties is infeasible, as it puts a heavy burden on the policy author. Shareability model 58, described in further detail below, includes one or more axioms that each specifies the shareability of a class or property in relation to one or more other classes or properties and thereby enables policy engine 62 to expand the relevance of a given policy rule to a requested data set without the policy author having to explicitly specify every relevant combination.

For most data access policies, it is not only of interest to control which values are allowed to be shared, but also—and in some cases more importantly—to control how different values are allowed to be joined. A well-known study shows that more than 85% of the population of the United States can be uniquely identified by their gender, zip code, and birth date; i.e., if a data set (such as voter registration lists or patient data from hospitals) contains triples of these attributes, it is possible to identify most persons in the data set. This identification is only possible if the attributes in question are given as triples. On the other hand, three individual sets of genders, zip codes, and birth dates will usually not enable the identification of any individuals, although in both cases exactly the same values are given. The difference is that in the former scenario, connected information between individual values is given, while this information is lacking in the latter scenario. Thus, an effective data access framework should include a specification of possible combinations of individual attributes that are shareable or not shareable.

In some examples, the Flora language is used to specify data requests. A data request is described using a Flora formula, which may contain a conjunction of subject-property-object triples, such as ?Community [resident→?Resident], and instance-of formulas, such as ?Resident: Person (variables are preceded by a question mark, ?). Such formulas are referred to herein as Request Formulas (RFs) or as Joint Data Sets (JDSes). Variables in the formula are free (not quantified), and thus the formula can be interpreted as describing the set of all matching data values. The classes and properties in the RF are part of a domain-specific ontology that is represented by a common data model, which defines a knowledge structure for the domain. Thus, as the ontology provides a common representation of the vocabulary of the domain, the request formulas provide a common representation of requests for data in the same domain. A data request may include a Request Formula or Joint Data Set to specify a requested data set. A policy rule may include a Request Formula or Joint Data Set to specify a corresponding data set for the policy rule, for which the policy rule applies.

At runtime, data requests are translated to concrete data-retrieval operations, depending on the types of data back-ends, e.g., SQL queries, MongoDB queries, HTTP REST calls, etc. For each such data backend, a translation layer is needed in order to translate to and from the ontology-based representation. For example, data may be stored to a data storage system, such as SQL, MongoDB, or other database servers, or other data storage system.

Figure 4A:
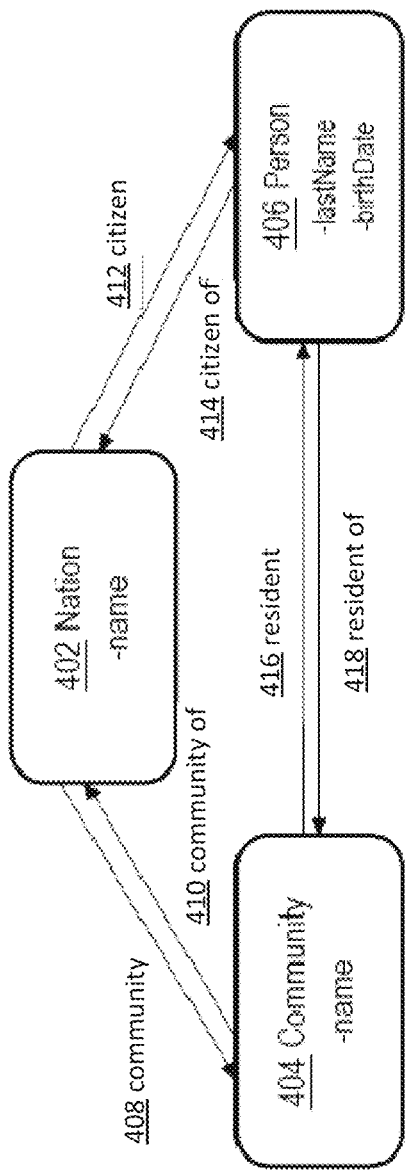
FIG. 4A is an example of a data model, according to techniques of this disclosure.
Figure 4B:
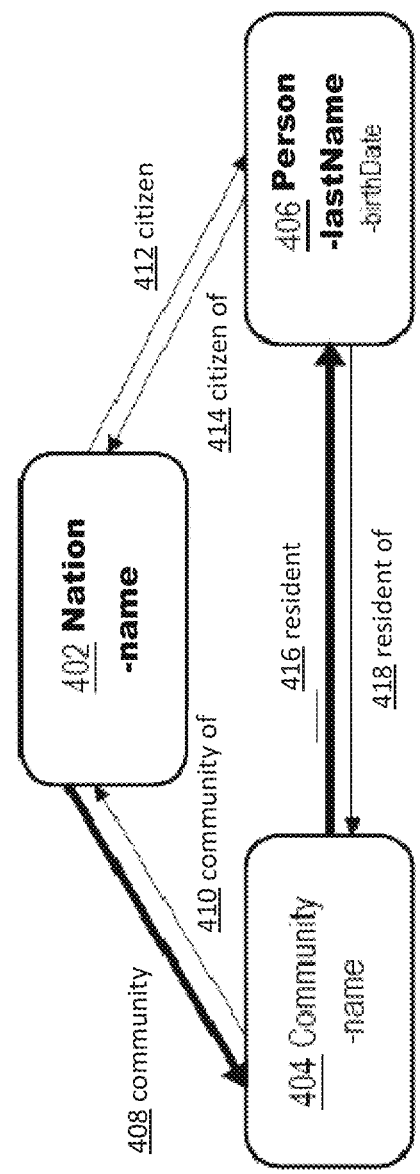
FIG. 4B is an example illustrating the data specification part of a policy, according to techniques of this disclosure.

FIGS. 4A-4B depict an example domain-specific ontology that serves as a common data model. The ontologies illustrate possible links between nations and persons. A data request may request a list of last names of nations' residents. In this example, the ontology does not contain a direct connection between nations and their residents, but instead resident information is provided per community, and communities in turn are associated with nations. In Flora, this Request Formula would be represented as RFp=${?Nation:Nation[name→?NationName,community->?Community],?Community:Community [resident→?Resident],?Resident:Person[lastName→?LastName]}.

The ${ . . . } syntax is Flora's reified formula construct, which formulas to be treated as a term (or object). The comma (,) denotes conjunction, i.e. logical AND. Note that only the variables ?LastName and ?NationName actually represent data properties of the ontology (and thus are elements that could potentially be shared with a data requester). The other variables are required to unambiguously specify how these two data properties are to be connected. This small example illustrates some important features of the Request Formula representation. First, note that the ontologies 400A-400C illustrate possible links between nations and persons that allows for two different ways of joining nation data with person data to identify (i) a nation's residents (through the intermediate class community), and (ii) a nation's citizens. These two associations represent different concepts and will usually result in different data sets. Thus, it does not suffice to simply specify that names of nations should be joined with persons' last names, but it needs to be explicitly specified how (i.e., on which properties) the data types are to be joined. Second, even though the above Request Formula specification traverses through the class Community, it does not reveal the association between persons and specific communities, since no data type from the class Community is contained in the Request Formula. Consequently, a policy rule may use a Request Formula or Joint Data Set to specify which possible combinations or individual attributes/combinations are shareable or not shareable.

Returning to FIG. 1, based on the matching policy rule, which specifies whether the corresponding data set entailed by the policy rule is shareable or not shareable, policy engine 62 determines a data sharing decision for data request 60 that indicates whether at least some of the requested data set is shareable or is not shareable (18). Policy engine 62 outputs this data sharing decision in a response for data request 60 (20). The data sharing decision may be applied by policy enforcement software 72, for example, to allow or disallow access to the requested data set.

Figure 2:
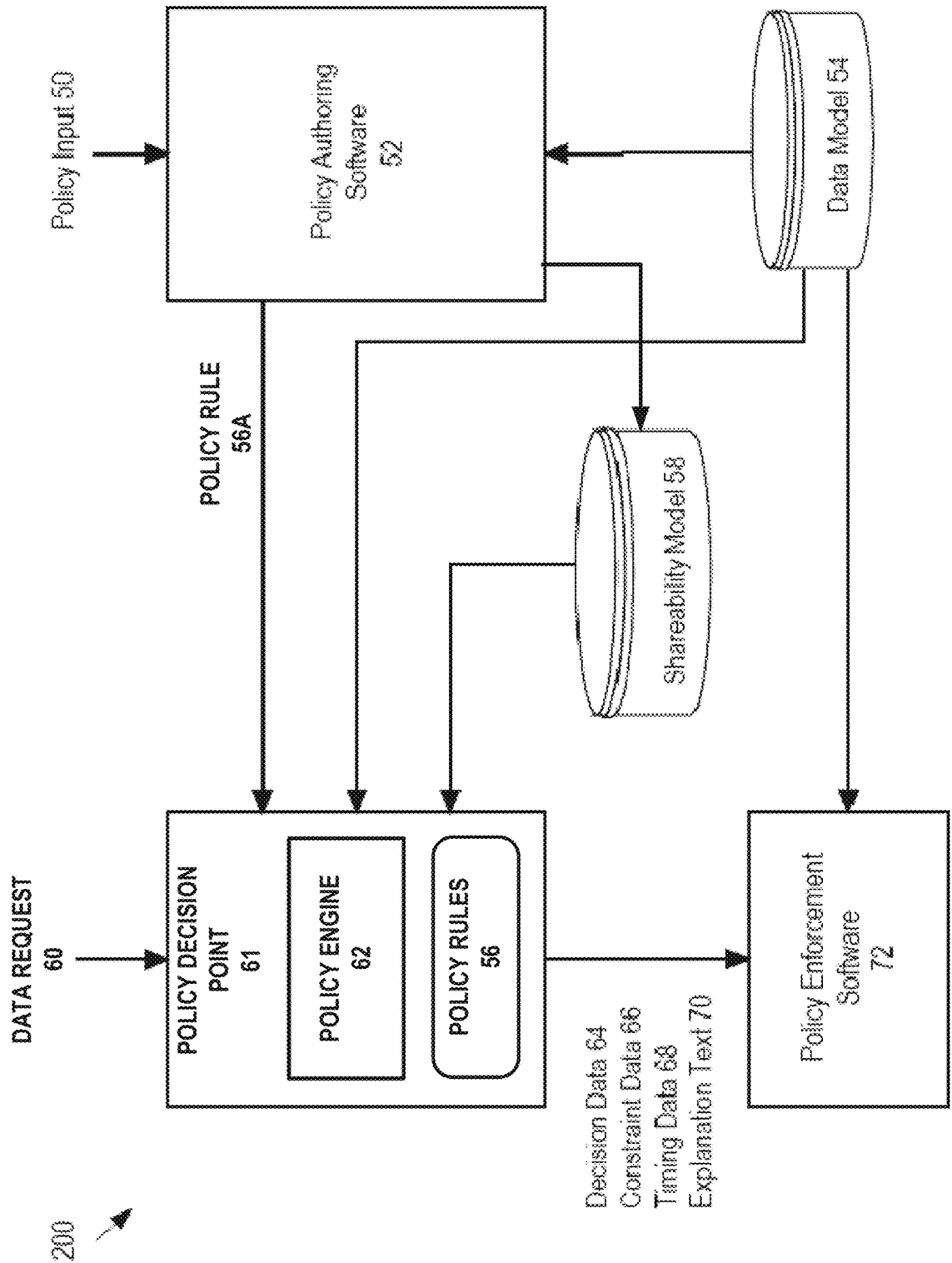
FIG. 2 illustrates an example system, according to techniques of this disclosure.

FIG. 2 illustrates an example system, according to techniques of this disclosure. FIG. 2 shows an arrangement of software-based components in which aspects of the present disclosure may be implemented. In an example, the software-based components include policy authoring software 52, data model 54, policy rules 56, policy decision point 61, policy engine 62, policy enforcement software 72. Example data includes policy rules 56, shareability model 58, and data model 54. The software-based component(s) 52, 61, 72 are executable by processor(s); for example computing device(s) 110, 140, display device 142, shown in FIG. 3, described in more detail below. For example, policy decision point 61 may be executed by one or more computer servers, policy enforcement software 72 may be executed by one or more computer servers, and policy software authoring software 52 may be executed by one or more computer servers. Shareability model 58 and data model 54 may be locally or remote stored and are accessible to one or more of policy decision point 61, policy authoring software 52, or policy enforcement software 72.

In an example, policy authoring software 52 receives policy input 50 and uses policy input 50 and data model 54 to create policy rule 56A. In an example, policy authoring software 52 includes a tightly integrated and synchronized suite of tools for ontology and rule understanding, editing, and validation, where the tools include editors, search capabilities, graph views, and query user interfaces. In an example, the FLORA-2 knowledge representation language is used along with XSB Prolog as well as JAVA and C++ libraries to build and operate policy authoring software 52.

In an example, policy authoring software 52 includes a privacy policy language that policy authors use to define and represent data sharing (or non-sharing) policies of stakeholders. In an example, the privacy policy language has features that include machine-readable syntax and rich semantics for expressing the nuances of privacy policy. An example of policy authoring software 52 includes an enhanced privacy policy language that addresses the needs of complex data request use-cases by providing the ability to define data requesters to which policies apply through attributes; a shareability theory that eases privacy policy specification; means to define policy timing information and policy constraints; and the ability to define data owners.

Policy authoring software 52 may generate and present interfaces by which a policy author may create, upload, modify, or otherwise configure shareability model 58, data model 54, and policy rules 56. In an example, policy authoring software 52 includes a graphical user interface and a software wizard to facilitate the creation of a data sharing policy. In an example, policy input 50 may identify data requesters who are permitted to receive data and/or any data requester who are not permitted to receive data, shareable data (or unshareable data), shareable data relationships (or unshareable data relationships), any constraint data 66 and any timing data 68. Policy input 50 may specify a Request Formula or Joint Data Set, constraint information, and timing information used by policy authoring software 52 to generate policy rule 56A.

Data model 54 represents a common data model that defines a knowledge structure for a domain of knowledge of data stored to a data system, for which policy enforcement software 72 enforces access control. Data model 54 may be configured by the policy author using policy authoring software 52 or may be a remotely-accessible ontology, for instance. The data storage system that stores data model 54 may also store the specific data instances described by data model 54. In some cases, the data model 54 and data instances may be stored by different data storage systems.

Thus, to define privacy or other access control policy rules 56 for some domain, an ontology is used as a common data model for that domain. The ontology defines a domain-specific vocabulary and background theory that describes the types of information relevant to the domain. The access control policy framework applied by components of system 200 uses the ontology to formally describe requested data (i.e., database queries) as well as constraints. Furthermore, axioms in the ontology can be used to infer sharing decisions. (Such axioms may be included as part of shareability model 58.) The ontology can be defined directly in Flora, or it can be defined in Web Ontology Language (OWL) and translated into Flora by Sunflower. Example data models are represented by ontologies 400A-400C.

Data model 54 can be used to facilitate the creation of joint data sets or request formulas, for example. In some cases, policy authoring software 52 may display a graphical view of data model 54, including data classes and subclasses arranged in a hierarchical fashion as well as semantic relationships between the classes. The policy author can then select particular data classes or subclasses and/or particular data relationships to include in the joint data set.

Constraints can be added to the joint data set that limit exactly which subsets of data are shared. Constraints can be applied to data properties that are shared or data properties that are not shared. Constraint types and values are determined based on the data type of the constrained class. For example, date is a temporal property, and thus the constraint types and values will relate to times.

Data model 54 defines the semantic relationships among all data classes and properties within the system 200. In an example, the policy language provided by policy authoring software 52 has generic concepts that allow defining access control policies for any domain, and data model 54 provides the domain-specific vocabulary that is used to generate domain-specific access control policies. Thus, to create a domain-specific policy, the domain independent policy language can be used in combination with the domain-specific data model; as such, the policy language itself does not need to be modified to accommodate the creation of policies for different domains.

To define data model 54, semantic concepts such as class and property (or "attribute") are used, in an example. A class defines a container for data of the same type. A property defines attributes that all instances of a class have in common. Properties can have a range type that is either a data type such as String, Integer, or Boolean, in which case the property is called a data type property; or their range type is another class, in which case the property is called an object type property.

For example, a defined class Person (with properties firstName and lastName, each with range type String and property citizenship with range type Nation, where Nation is a class with data-type property name of type String) defines a container for instances or individuals that have all the same format or structure. That is, each instance of class Person has values defined for these properties.

Using an ad hoc dot notation from object-oriented programming, an instance P1 of class Person could be defined with the following values for a person's properties:
P1.firstName="Louis"
P1.lastName="Brandeis"
P1.citizenship=C1, (C1 is an instance of class Country)
C1.name="United States of America"
P1 (an instance or individual of class Person) represents a person who is an American citizen named Louis Brandeis.

In an example, data model 54 is specific to a domain and provides the basic vocabulary to specify the data and data relationships that are addressed in data sharing policies. The use of properties with another class as a range type enables the specification of joint data sets or request formulas, where specific connections (also referred to as links, data relationships, or semantic relationships) between different classes are specified. Below are two examples of different joint data sets.
JDS1={Nation.name, Nation.citizen.lastName}
JDS2={Nation.name, Nation.community.resident.lastName}

Both properties Nation.citizen and Community.resident have the range person, and thus both JDS1 and JDS2 specify a correlation between nation names and persons' last names. The difference, however, is in the way these two properties are connected. The former JDS results in a list of last names for a nation's citizens, while the latter results in a list of a nation's residents, obtained by traversing the path from a nation to all of its communities, and in turn to each community's residents.

Examples of the disclosed technologies use joint data sets in the definitions of policies to define unambiguously which data is being shared or protected by a policy. In an example, request data 60 may be specified using a joint data set as a template to define what data is being requested. Including the specification of how different data items may or may not be connected provides a means to control what information is released. In many cases, the isolated values of individual data items carry only little information that require privacy protection, while at the same time correlations of individual values may constitute sensitive information, for example, personally identifiable information.

In an example, joint data sets are implemented in FLORA as reified formulas. Representing joint data sets (which may be used both in the policy and in data request specifications) as reified FLORA formulas facilitates the definition of a shareability theory that can be implemented as shareability model 58, which enables policy reasoning software 62 to reason about relations between policy rules 56 and request data 60 and thereby accommodate inexact matches between request data 60 and policy rules 56.

Once the policy author has specified the basic information to policy authoring software 52, as policy input 50, policy authoring software 52 generates policy rule 56A. A policy rule may have one or more of the following components: the policy authority who defines the policy rule, a statement defining it as permissive (shareable) or restrictive (not shareable), the data requester(s) to whom the policy rule applies, a specification of the corresponding data set, the type of data that is affected by the policy rule, the time when this policy rule is effective, optionally a set of constraints for policies that define the conditions when sharing is allowed or denied, and finally an identifier and description for the rule.

As part of this process of generating policy rules, common data model 54 may be used to facilitate configuration and generation of policy rules 56. For example, in policy input 50, a policy author may identify a particular organization as a data requester. By virtue of the data relationships in data model 54, policy authoring software 52 may in some cases automatically identify each individual who is a member of that organization as a data requester. In this way, the policy author may avoid having to struggle to correctly write a potentially complex logical expression to represent the desired policy. Policy decision point 61 receives and adds policy rule 56A to policy rules 56.

To specify the data to be shared and any constraints on sharing that data, an example of policy authoring software 52 may prompt the policy author to indicate whether the policy is allowing data to be shared or denying data to be shared, e.g., a simple allow or deny policy. In an example, policy authoring software 52 may further prompt the policy author to specify one or more joint data sets. A joint data set indicates a subset of data elements that can be shared together, e.g., in combination with one another. To share data jointly, the data may be shared for example as a table with each class or property as a separate column in the table.

If a joint data set is specified, policy authoring software 52 prompts the policy author to identify the data elements that are included in the joint data set and any applicable constraints. Alternatively, the policy author may indicate that all data is shareable or that no data is shareable, with respect to a particular data requester.

Shareability model 58 includes one or more axioms that each specifies the shareability of a class or property in relation to one or more others classes or properties and thereby enables policy engine 62 to expand the relevance of a given policy rule to a requested data set without the policy author having to explicitly specify every relevant combination. The axioms allow policy engine 52 to infer the applicability of each policy rule 56 to data request 60 from what has been explicitly stated in the policy rule.

As explained elsewhere herein, the concept of Request Formula or Joint Data Set (hereinafter described for convenience only with respect to RFs) is used in the privacy policy framework to specify (i) what data is requested in a specific request, and (ii) what data is affected (allowed or disallowed) by a policy rule. However, it does not suffice to check whether the requested RF exactly matches the RF in the policy rules. In most cases, a policy author intends to specify policies that capture a large variety of property combinations. Expecting separate specifications for every relevant combination of properties is infeasible, for it puts a heavy burden on the policy author. Instead, a more flexible relation between requested and allowed RFs needs to be defined.

A unary higher-order predicate S (for "shareable") takes a RF as an argument. This predicate is used to reason about what requests are allowed or disallowed by what policies. For an allow policy, we specify a RF that is allowed by the policy, RFp (e.g., policy rule 56A). As a first approximation, to check whether a request for RFr (e.g., an RF specified in data request 60) is allowed, we must prove that: $\exists \overline{x}_p$:

$S(RF_p) \models \exists \overline{x_r}: S(RF_r)$, where $\overline{x_p}$ is the set of variables in RFp, and $\overline{x_r}$ is the set of variables in RFr. Conversely, for a disallow policy to trigger, we must check whether: $\exists \overline{x_p}: S(RF_r) \models \exists \overline{x_p}: S(RF_p)$. Here, $\models$ is entailment in the underlying logic (e.g., Flora). Roughly, we can think of allow policies as allowing any subset of RFp, and disallow policies as disallowing any superset of RFp. A simple example gives an intuition for why this makes sense: consider an example where a triple of gender, zip code, and birth date is used to uniquely identify persons. If such an identification should be prevented, an according disallow policy is needed for such triples. Any singletons or pairs in this set usually don't contain enough information to identify individual persons, and thus can be shared without compromising the policy's intent. On the other hand, any supersets (i.e., sets containing this triple and additional data types) clearly contain (more than) enough information to identify individual persons and thus should be denied.

A number of axioms for S allow policy engine 62 to infer what can be shared (or not shared) from what has been explicitly stated. For example if $S((x,y))$ (the conjunction of the formulas x and y) can be shared, then $S(x)$ can be shared. Policy engine 62 may also incorporate, into the decision, additional background information specified in the ontology specified by data model 54. For example, axioms may specify that a property "residence" is the inverse of the property "resident," i.e., if x is a resident of y, then y is the residence of x. This background information may be represented in an axiom stating that if $?x[?p \rightarrow ?y]$ is shareable, and $?p$ is the inverse of $?r$, then $?y[?r \rightarrow ?x]$ is shareable. Similarly, given that a superclass can be shared, an axiom may be specified to allow sharing of all subclasses of that superclass. These axioms can be customized for a particular domain and form the shareability theory represented in shareability model 58. The shareability model 58, as well as the underlying Flora entailment checks, may be implemented in Flora.

We must now modify our proof obligation to include the background knowledge B; we must check whether $B \cup \exists \overline{x_p}: S(RF_p) \models \exists \overline{x_r}: S(RF_r)$ (for allow policies), or whether $B \cup \exists \overline{x_r}: S(RF_r) \models \exists \overline{x_p}: S(RF_p)$ (for disallow policies). For instance, using the inverse property axiom mentioned above, RFp described in the previous section entails that RFr=\${?Person:Person [residence→?Community], ?Community:Community} is shareable. Shareability reasoning with a background theory, as applied by policy decision point 61, thus allows a policy rule to generalize over many different requests. Policy engine 62 may use automated reasoning technology to realize the entailment checks.

Policy decision point (PDP) 61 makes access control decisions for data stored to a data storage system. The PDP supports two main uses: (1) interfacing with user interfaces (Policy Administration Points such as policy authoring software 52) for the creation, validation, and management of privacy policies; and (2) interfacing with systems (Policy Enforcement Points, PEP), such as policy enforcement software 72, that manage data requests and replies by coordinating PDP decisions and access to databases using various privacy-enhancing or other access control techniques. The ontology is shared between Policy Administration, Decision and Enforcement Points. In some examples, policy decision point 61 may be a Sunflower system, which extends the Flora2 language and reasoner with features such as a HTTP REST Web server, Java APIs, editing UIs, and features for producing structured explanations of reasoning results in natural language.

In an example, policy decision point 61 receives request data 60 at runtime. Policy engine 62 executes the disclosed reasoning capabilities to decide if and under what conditions information can be shared with data requesters. Policy engine 62 may execute policy reasoning software to perform the disclosed reasoning capabilities. Policy engine 62 uses data model 54, policy rules 56, and shareability model 58 to infer decision data 64, constraint data 66, timing data 68, and explanation text 70. Policy engine 62 outputs decision data 64, constraint data 66, timing data 68, and explanation text 70 for use by policy enforcement software 72.

In an example, policy engine 62 uses the FLORA-2 reasoner capabilities, including support for n-ary formulas, negation-as-failure, aggregation, higher order predicates, functions, frame syntax for classes and instances, infix mathematical expressions, prioritized or default rules, and knowledgebase update operators, to integrate data model 54 and shareability model 58 to match the request data 60 to the policy rules 56 (as modified or expanded by data model 54 and/or shareability model 58), provide the disclosed policy reasoning capabilities, and output the resulting data sharing decision data 64.

In an example, policy engine 62 includes a reasoning engine that can provide explanations in natural language, support reasoning about hard and soft constraints, and rank solutions. In an example, an explanation module of policy engine 62 provides structured explanations of the policy reasoning results and a natural language module that produces natural language paraphrases of the policy reasoning results and the structured explanations.

In an example, the policy reasoning capabilities of policy engine 62 are exposed by a Web server over HTTP using REST APIs. As such, portions of policy engine 62 can be deployed as a stand-alone system or along with existing systems, for example as part of enterprise-level applications or client/server architectures, via its Web API.

An illustrative, non-limiting example of a reasoning process that may be performed by an example of policy engine 62 to infer data sharing decisions is provided below. When policy engine 62 receives request data 60 indicating a request for sharing some data, in an example, sharing decisions are inferred in several steps:

Determine Isolated Decision

Request data 60 including requester attributes and requested data are used to find matching policy rules 56 according to attribute and policy definitions, respectively. In this first step, timing information may be used to filter out rules for which the time window has already expired, i.e., no rules are considered for which request time≥policy end time holds. This results in a set D of isolated decisions d.

Attach Timing Information

To each individual decision d from D, timing information is attached according to the following rules:

startTime(d)=max{request time, policy start time}
endTime(d)=min{request time+default duration, policy end time}

Determine Overall Decision

Filter isolated decisions D for currently applicable decisions D', i.e., decisions for which the start time is less or equal than the request time. Then, identify decision d' with highest precedence.

Determine Expiration

The previous step has already determined the final sharing decision. However, another step is required to determine expiration of this decision: This checks for the existence of other policy decisions d from (D\D') with:

precedence(d')>precedence (d)
decision(d')≠decision (d')
startTime(d')<endTime (d)

If another decision d satisfying the above three properties exists, this means that the final decision d' will be overridden before its natural expiration time. Thus, the expiration of d' is set accordingly:

expiration(d')=startTime(d) to ensure that d' will not incorrectly remain valid after opposing decision d becomes active. If no such decision d exists, the expiration is simply set to expiration(d')=endTime(d).

Policy Constraints

In some examples, one or more policy rules 56 may each specify one or more policy constraints that apply to a property variable referenced by the policy rule. If a policy constraint is triggered by a data request 60, policy engine 62 may generate, based on the policy constraints and the property variable, constraint data 66 that applies to the requested data set for data request 60. The presence of constraints in policy rules 56 enables policy decision point 61 to return policy constraints to PEPs and it does not need to apply the policy constraint to data stored to the data system in order to make a policy decision. That is, the data need not be accessed by policy decision point 61. Instead, the triggering of a policy constraint can be determined using policy rules 56 and shareability model 58. For policy constraints that apply to a property variable, at least some of the requested data set for data request 60 may be applicable to the constraint and thus will be filtered accordingly, while for some of the requested data set the constraint will not apply because such data does not include values for the property variable and so is shareable (or not shareable, per the matching policy rule).

Accordingly, in some examples, policy engine 62 is not only able to return plain allow or deny decisions, but policy engine 62 can also refine allow or deny decisions by optionally attaching constraints to specific allowed data items. For instance, a policy authority specifying policy input 50 for policy rules 56 might be willing to share personal information of residents over the age of 13 years, while retaining the more sensitive data of young children. Since policy engine 62 only derives general sharing decisions without access to actual data stored to the data storage system for which policy enforcement software 72 controls access, constraints cannot be evaluated within the policy engine 62. Instead, policy decision point 61 sends constraint data 66 specifying the constraints, along with decision data 64, to the policy enforcement point (represented in FIG. 2 as policy enforcement software 72), which just understand the constraint vocabulary. The policy enforcement software 72 may then enforce those constraints indicated in constraint data 66 when fetching instance data from data back-ends, before returning results to the requester. Example types of constraints include temporal constraints (e.g., "time before", "time after"), aggregation constraints (e.g., "only share aggregated counts of a value"), privacy constraints (e.g., "only share aggregations with additional noise"), and geographical constraints (e.g., "only share for entities in a specific region").

Since the policy engine 62 may only derive general sharing decisions without access to actual data, constraints may not be evaluated within policy engine 62. Instead, the constraints are returned, along with the sharing decisions, to the policy enforcement software 72, which is then able to enforce those constraints when fetching instance data from data backends, before returning results to the requester.

The common constraint vocabulary shared with the policy enforcement software 72 may consist of a set of predicates and a set of different value type definitions. The general format of constraints exchanged with policy enforcement software 72 is then predicate(object,value(s)). Some examples predicates may include predicateSet={Equal, LessThan, LessThanOrEqual, GreaterThan, GreaterThanOrEqual, Instance Of, WithinRectangularRegion, WithinCircularRegion, Aggregation, DP, AddNoise}

The set of defined value types may include:
Aggregation Value, an enumeration of possible aggregation functions
Geodetic2DValue, a coordinate specified through lat/long values
Individual Value, an instance of a CDM class
NumberValue, any number
Offset Time Value, a time duration to specify an offset relative to a TimeValue (e.g., to specify that a birthdate should be 18 years before the request time). This makes sure that constraints such as age constraints can always be evaluated relative to the current time.
PathValue, a path in the common data model. This allows specifying constraints not only with respect to specific values, but also as a reference to other properties. For instance, one could use this to specify constraints such as "last checkup date is after last travel date."
StringValue, any string
TimeValue, a specific time point given with date and time The definition of the constraint vocabulary maintains information about admissible number and type of values for each predicate. For instance, "Equals" requires one argument and can be applied to any of the defined value types; "WithinRectangularRegion" requires two arguments of type Geodetic2DValue to specify NE and SW corners of the region, and so on.

Adapting the constraint vocabulary to new use-case requirements is very simple on the side of the policy engine 62: Since constraints are not evaluated, but simply forwarded to the policy enforcement software 72, it is easy to extend the above vocabulary definitions and expose the extensions through the API accordingly. The systems may ensure that there is a common understanding of the constraint semantics between the policy engine 62 and the policy enforcement software 72 and that policy enforcement software 72 has means to enforce these semantics accordingly.

Since a single policy rule 56 can be triggered by a variety of requests, a flexible mechanism is used to bind constraints to specific variables in the requested JDSs/RFs. To ensure that constraints are returned in the correct context, they may in some examples not be attached to policy rules 56 as a whole, but instead to specific data items specified in a policy rule 56. To achieve maximum flexibility in the constraint specification, in addition to allowing for a specification of constraints on requested property values, the techniques may also allow for specifying constraints on other property values, which are potentially not included in the data request 60. To achieve this, each constraint may in some cases be specified with a constraint subject and a constraint object, both in terms of entities of the common data model. Whenever a data request 60 for some data includes the subject of a constraint, the corresponding constraint object is attached to the policy decision. To illustrate this, consider the following (simplified) representation of a JDS for sharing persons' last names and their medical information:

JDSmedical={Person.lastName, Person.medicalInformation}

Now, assume that only medical data of adults should be shared. This could be expressed with a constraint (in informal representation) with the following information:

$Constraint_{age}$=(subject=Person.medicalInformation, object=Person.age, predicate=greatherThan, argument=18)

As a result, whenever access to Person.medicalInformation (the constraint subject) is requested, the constraint on the corresponding object is returned, i.e., "GreaterThan (Person.age, 18)", even though neither the policy rule nor the request include Person.age as a shareable data item. On the other hand, a request for only Person.lastName would return an unconstrained allow decision, since the constraint's subject is not requested and thus the constraint is not triggered. Note that the constraint specification does not explicitly restrict the combination of last names and medical information, but it does restrict the access to the one property that is usually used to combine these two types of information (namely Person.medicalInformation). Thus, effectively, the constraint specification limits access to the combination of persons' last names and their medical information to people who are older than 18 years.

It is powerful to be able to explicitly put constraints on a connecting property rather than only allowing constraints on combinations of information. For example, take the excerpt 400A from a common data model that shows Persons who are citizens of a Nation and Persons who are residents of a Nation (via residency in a Nation's community).

A policy authority might want to protect the combination of a Nation's name and their citizens' last names, but they might be willing to share the combination of a Nation's name and their residents' last names. To achieve this, the constraint would be specified on the connecting property Nation.citizen, rather than generally all possible combinations between of Nation.name and Person.lastName. Additional description of constraints is included elsewhere in this disclosure.

A single data request 60 might trigger different policy rules 56 with conflicting decisions, i.e., one policy rule allows to share the request data, while another policy disallows to share the requested data. In those cases, policy engine 62 must determine the overall desired effect. To achieve this, system 200 provides a flexible mechanism to designate which policies can override other policies. System 200 allows for overriding criteria based on priorities, authority hierarchies, and authority delegations. For example, priorities can be used to define baseline policies (such as "don't share anything with anyone") and then create exceptions to this baseline by defining policy rules 56 with higher priorities to allow sharing of specific data.

Policy Enforcement Software

In many scenarios, the same requests are repeated at regular intervals to access updated values of the same data item such as current vehicle locations. In these cases, the request data 60 received by policy engine 62 is exactly the same each time, except for the updated request times.

Thus, in some examples, after policy engine 62 has reasoned about the corresponding sharing decision once, the resulting decision data 64 is stored in a decision cache, and if the same request is received again, later on, the server will first check whether the decision cache already contains a non-expired decision corresponding to this request. If such a cached decision is found, policy decision point 61 can return this immediately to the policy enforcement software 72, without the need to ever actually invoking the policy reasoner.

To ensure that the decision cache is always in sync with the currently defined set of policies. (i.e., if the set of policies is changed, outdated decisions must not remain in the decision cache), policy decision point 61 has two different modes of ensuring validity of the decision cache:

Decision Prefetching

If any change (deletion, addition, or modification of a rule) is made to the set of policy rules, all cached decisions are re-evaluated with respect to the updated set of policy rules. An advantage of this approach is that future repetitions of requests can be served immediately with updated results from the decision cache, even though the result itself might not have been sent to the user ever before.

Decision Flushing

Instead of re-evaluating all cached decisions to pre-fetch updates, the decision cache can simply be flushed upon any change to the set of policies. The performance behavior is exactly opposite to the previously described mode: changes to the set of policies can be performed quickly, but subsequently, first requests will again require more reasoning time. The desired mode of operation can be set by the policy authority to best fit their needs.

Policy decisions output by policy engine 62 are enforced by policy enforcement software 72. In an example, when data requesters request certain types of data, the requested data itself is stored in an encrypted database (DB).

Before policy enforcement software 72 retrieves data from the encrypted DB to provide results to the data requester, it needs to determine which of the requested data types the requester is allowed to see and under what conditions. For example, if policy rules 56 disallow sharing the requested type of data with the requester, then policy enforcement software 72 cannot return any results. (The requester may be the initiator of data request 60 and the intended recipient of the requested data set.)

Another case occurs when requesters ask statistical questions (e.g., "how many people are infected with the virus?"). A policy rule 56 may allow sharing of such statistical data if the return values are protected through error padding, such as that achieved through differentially private computation methods. In this case, the policy engine 62 will provide policy enforcement software 72 with the sharing constraints; that is, it will apply a differentially private computation method that policy enforcement software 72 will enforce through appropriate privacy-preserving and/or data access control methods.

Figure 3:
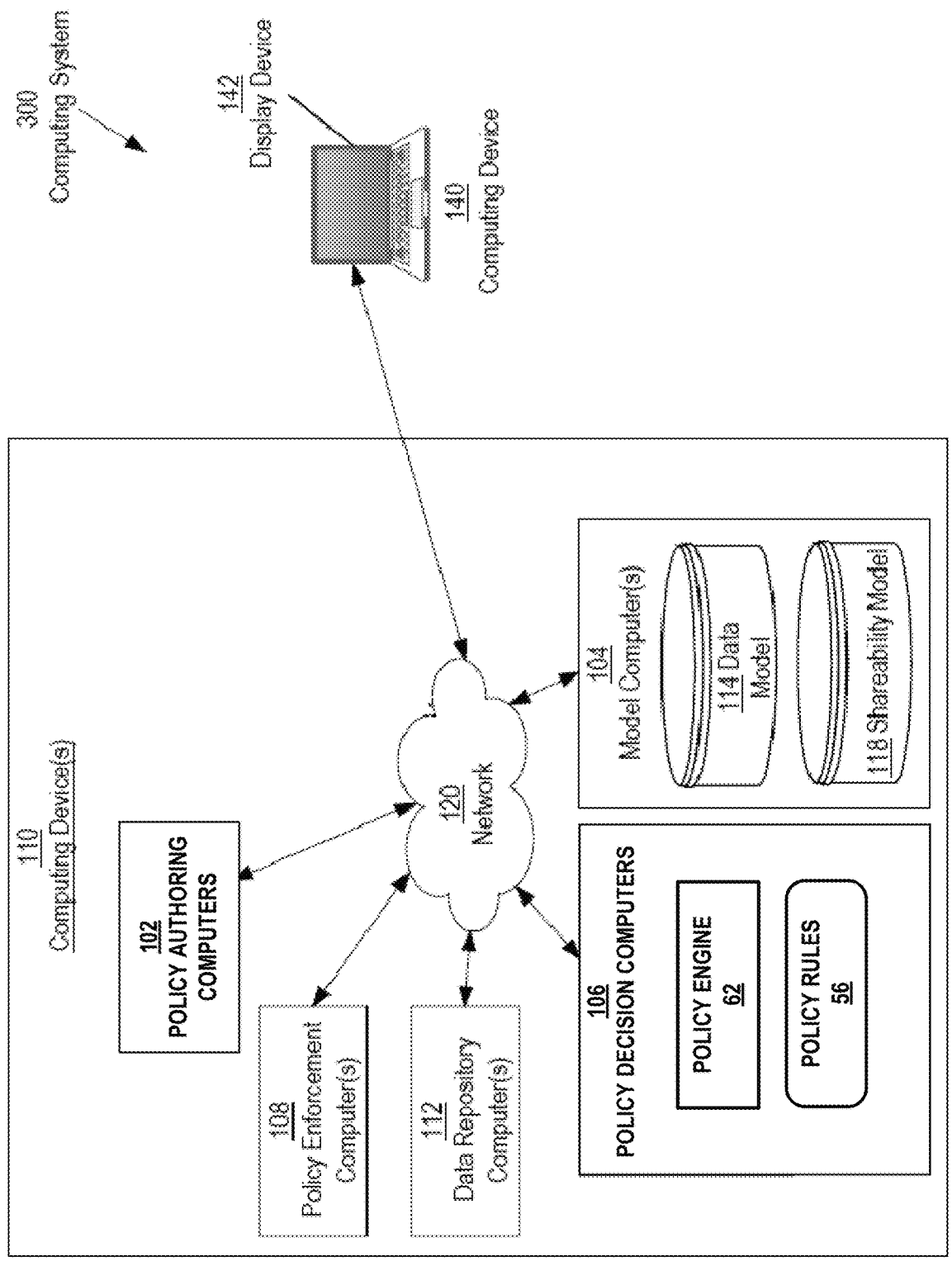
FIG. 3 illustrates an example computing system, according to techniques of this disclosure.

FIG. 3 illustrates an example computing system 300, according to techniques of this disclosure. In the example of FIG. 3, computing system 300 includes at least computing device(s) 110, a computing device 140, and a display device 142, which are communicatively coupled to an electronic communications network 120. In an example, computing device 140 is a client computing device, such as a mobile computing device, smart phone, smart speaker, wearable computing device, smart appliance, laptop machine, or other computing device, while a computing device(s) 110 are a server computer or network of server computers connected to the Internet, in the cloud, for example. In an example, computing devices 110, 140 each include a network interface for communicating with network 120.

Implemented in computing devices 110, 140 using computer software, hardware, or software and hardware, are combinations of automated functionality, data structures, and digital data, which are represented schematically in FIG. 3 as policy authority computer(s) 102, data model computer(s) 104, policy decision computer(s) 106, policy enforcement computer(s) 108, data model(s) 114, reasoning software 116, shareability model 118.

In an example, policy authority computer(s) 102 host policy rules 56 of FIG. 2 and policy authoring software 52 of FIG. 2. Thus, in an example, operation 10 of FIG. 1 may be performed by policy authority computer(s) 102 acting as a web server and interfacing, via network 120, with a web client on a user-facing device similar to computing device 140.

In an example, data model computer(s) 104 host and maintain data model(s) 114. Data model(s) 114 include data model 54 of FIG. 2, in an example. In an example, policy decision computer(s) 106 do not maintain the data to which access may be sought by a requester but only the database schemas and policy rules.

In an example, policy decision computer(s) 106 host policy engine 62 and policy rules 56. In some examples, policy decision computer(s) 106 host shareability model 118 rather than model computer(s) 104 as shown. Policy engine 62 includes, in an example, features and functionality of policy engine 62 of FIG. 2 and/or operations 12, 14, 16, 18, 20 of FIG. 1, described above. Shareability model 118 include features of shareability model 58 of FIG. 2, described above and/or described in connection with operation 16 of FIG. 1. In an example, shareability model 118 may be implemented as CSV files that policy engine 62 can import, e.g., at runtime. As well, in an example, policy decision computer(s) 106 connect to remote Web services and databases at runtime.

In an example, policy decision computer(s) 106 include server computer(s) that exposes a general-purpose, low-level REST API, which includes methods to run queries and manipulate knowledge base content. This interface may expose the features of reasoning software as a web service. In an example, this API is specified using the API specification language SWAGGER.

In an example, data repository computer(s) 112 host one or more searchable databases that store data that may be the subject of one or more data requests and subject to policy rules 56 as enforced by policy decision computer(s) 106. In an example, policy rules 56, data model(s) 114 and shareability model 118, as well as data that may be the subject of one or more data requests, are stored in one or more MySQL or other databases.

A client (e.g., a policy request) may initiate a data request via computing device 140. The session associated with the client will interface with policy decision computer(s) 106 via network 120 to perform reasoning with respect to policy rules 56 and shareability model 118 to determine a shareability decision for data stored in the database(s) maintained by data repository computer(s) 112. In another example, policy decision computer(s) 106 can directly connect to arbitrary relational databases or RDF triple stores at runtime.

In an example, policy authority computer(s) 102 stores and operates portions of policy authoring software 52; data model computer(s) 104 stores and operations portions of data model 54; policy decision computer(s) 106 store and operate portions of policy engine 62, and policy enforcement computer(s) 108 store and operate portions of policy enforcement software 72, all of which are described above with reference to FIG. 2.

In FIG. 3, data model(s) 114 are used to store and operate data models. As used herein, the term model may refer to a combination of digital data and programming logic that embodies a computerized representation of semantic, logical and/or mathematical relationships between data elements. For example, a model usable by a computer stores data that indicates semantic relationships between data classes, subclasses, and properties or attributes of classes and subclasses.

Although computing system 300 may be implemented with any number N, where N is a positive integer, of policy authority computer(s) 102, data model computer(s) 104, policy decision computer(s) 106, policy enforcement computer(s) 108, data repository computer(s) 112, data model(s) 114, reasoning software 116, shareability model 118, computing devices 110, computing devices 140, display devices 142, respectively, in this disclosure, these elements may be referred to in the singular form for ease of discussion. Also, policy authority computer(s) 102, data model computer(s) 104, policy decision computer(s) 106, policy enforcement computer(s) 108, data repository computer(s) 112, data model(s) 114, reasoning software 116, shareability model 118, computing devices 110, computing devices 140, display devices 142, are shown as separate elements in FIG. 3 for ease of discussion but the illustration is not meant to imply that separation of these elements is required. Different instances of computing device 140 may be used by different users to author policy rules, request data, modify data model 114 and shareability model 118, and so forth.

The illustrated systems and their functionality may be divided over any number of physical systems, including a single physical computer system, and can communicate with each other in any appropriate manner. For example, in some implementations, policy authority computer(s) 102, data model computer(s) 104, policy decision computer(s) 106, policy enforcement computer(s) 108, data repository computer(s) 112, data model(s) 114, reasoning software 116, shareability model 118, computing devices 110, computing devices 140, display devices 142, are all embodied in computing device 140.

Any of the components of computing system 300 may be equipped with input devices for purposes of obtaining input data. For example, computing device 140 may be equipped with or coupled to a keyboard, keypad, touchscreen, touchpad, microphone, or other sensing device(s) configured to obtain input data. Such input data is received by computing device 140 and routed to other components of the computing system 300 as described in this document or otherwise as needed.

Likewise, any of the components of computing system 300 may be equipped with output devices for purposes of presenting output. For example, computing device 140 may be equipped with or coupled to a display screen, touch screen, speaker or other output device(s) configured to output information. Such output data may be received from other components of the computing system 300 as described in this document or otherwise as needed. For example, a graphical user interface operated by computing device 140 may display graphics including dialog boxes and graphical content in order to facilitate the operations of any of the software components shown in the figures.

In general, each of computing device(s) 110, 140, display device 142, and network 120 contains hardware components similar or analogous to corresponding components shown in FIG. 5, described below. Network 120 may be implemented on any medium or mechanism that provides for the exchange of data between the devices that are connected to the network. Examples of network 120 include, without limitation, a network such as a Local Area Network (LAN), Wide Area Network (WAN), Ethernet or the Internet, or one or more terrestrial, satellite or wireless links. Network 120 may include a combination of networks, such as a combination of wired and wireless networks, as needed to enable communications between the computing device(s) 110, 140, 142.

Computing device 140 interfaces with computing devices 110 to establish logical connection(s) over network 120 with portions of policy authority computer(s) 102, data model computer(s) 104, policy decision computer(s) 106, policy enforcement computer(s) 108, data repository computer(s) 112, data model(s) 114, reasoning software 116, shareability model 118, computing devices 110, computing devices 140, and/or display devices 142, at various times as needed for the operation of computing system 300.

FIG. 4A is an example of a data model 400A, in an example. Data model 400A may be created using policy authoring software 52, in an example. Data model 400A is represented in FIG. 4A as a graph, with nodes 402, 404, 406 representing data elements or classes and links 408, 410, 412, 414, 416, 418 representing semantic relationships between the data elements or classes 402, 404, 406. Within each node 402, 404, 406, one or more attributes or properties of the data element or class 402, 404, 406 is identified. For example, name is an attribute of nation 402 and community 404, and birthDate is an attribute of person 406. Attributes are alternatively referred to herein as properties. For example, "name" is a property of the Nation class 402 in data model 400A.

Semantic relationships 408, 410, 412, 414, 416, 418 are bidirectional. For example, link 408 represents a "has" link from nation 402 to community 404 and link 410 represents the inverse relationship, "is" from community 404 to nation 402.

FIG. 4B is an example illustrating the data specification part of a policy 400B, in an example. In an example, policy 400B is created using policy authoring software 52 to manipulate data model 400A by highlighting links 408, 416. Policy 400B is a visual representation of what may be stored as human and/or machine-readable text. The bold emphasis of link 408 indicates that data in the community class 404 can be linked in combination with data in the Nation class 402 and the bold emphasis of link 416 indicates that data in the Person class 406 can be linked in combination with data in the Community class. Together with the bold emphasis of the links 408 and 416, the bold emphasis of Nation.name and Person.lastName indicates that nation names can be linked to person names that are residents of communities of the corresponding nation.

However, links 412, 414 are not bolded and so the citizen relationship between nation 402 and person 406 is not shareable according to policy 400B. Thus, policy 400B permits returning results to a query that asks for "residents of Cebu nation" but does not allow results to be returned for a query that requests "citizens of Cebu nation." Policy 400B also permits sharing of names of nations, or names of all communities in a particular nation, or all residents of a particular community.

Other examples of axioms that can be included in and applied as part of a shareability model include but are not limited to: classes with an inheritance relationship are allowed; subsets are allowed, supersets are not allowed. An example of an application of an inheritance shareability axiom occurs when a query specifies a class, the policy allows sharing of the class, then the shareability model that includes this axiom causes policy engine 62 to expand the policy to allow sharing of a subclass of the shareable class. For example, if vehicle is shareable then car is shareable.

An example of an application of a subset shareability axiom occurs when a policy specifies that person is shareable, the shareability model that includes this axiom causes policy engine 62 to expand the policy to allow sharing of a subset of all persons whose age is greater than 21 years.

An example of a superset disallow shareability theory occurs when a person class contains attributes first name, data of birth, and zip code; the policy specifies that first name and date of birth are shareable, the shareability theory expands the policy to prevent sharing of zip code in combination with first name and date of birth.

While this disclosure describes examples that are directed to the creation, execution, and enforcement of data sharing policies, aspects of the disclosed technologies are equally applicable to other computer-implemented policy-driven processes, including but not limited to any form of network security policy, access control policy, data privacy policy, etc. Also, while this disclosure describes examples that involve automatic enforcement of policies, aspects of the disclosed technologies are equally applicable to other types of automatic rule-based mechanisms that govern online processes and behaviors, including but not limited to decisions to write as well as read data, and the creation, execution and enforcement of other types of use restrictions, such as restrictions that may be contained in legal terms and conditions such as web site terms of use, software license agreements, open source licenses, and the like.

According to one example, the techniques described herein are implemented by at least one computing device. For example, portions of the disclosed technologies may be at least temporarily implemented on a network including a combination of at least one server computer and/or other computing devices. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, personal computers, or a network of server computers and/or personal computers. Illustrative examples of computers are desktop computer systems, portable computer systems, handheld devices, mobile computing devices, wearable devices, body mounted or implantable devices, smart phones, smart appliances, networking devices, autonomous or semi-autonomous devices such as robots or unmanned ground or aerial vehicles, or any other electronic device that incorporates hard-wired and/or program logic to implement the described techniques.

Figure 5:
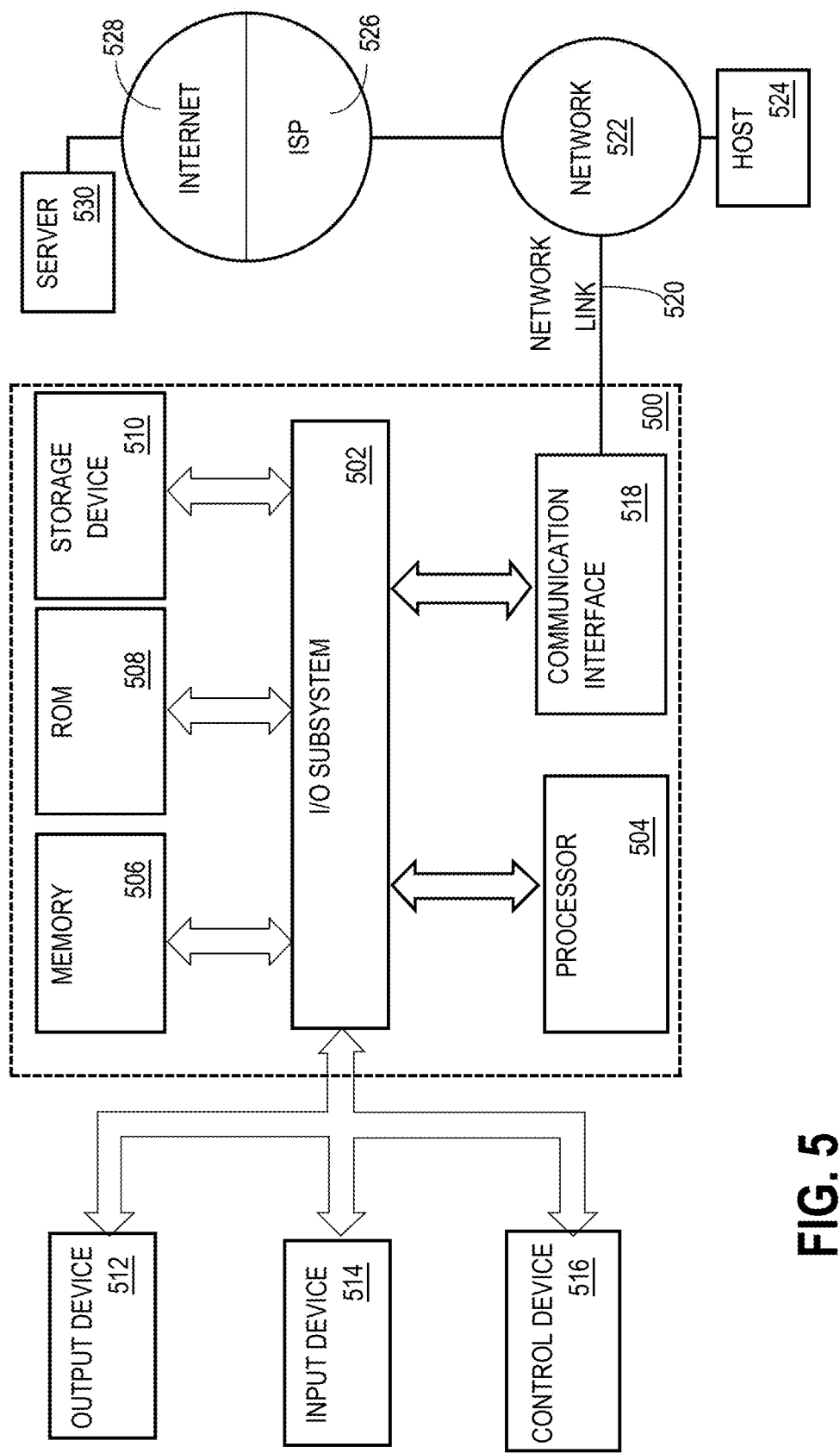
FIG. 5 is a block diagram that illustrates an example hardware environment upon which examples of the techniques of the disclosure may be implemented.

For example, FIG. 5 is a block diagram that illustrates a computer system 500 upon which an example of the present invention may be implemented. Components of the computer system 500, including instructions for implementing the disclosed technologies in hardware, software, or a combination of hardware and software, are represented schematically in the drawings, for example as boxes and circles.

Computer system 500 includes an input/output (I/O) subsystem 502 which may include a bus and/or other communication mechanism(s) for communicating information and/or instructions between the components of the computer system 500 over electronic signal paths. The I/O subsystem may include an I/O controller, a memory controller and at least one I/O port. The electronic signal paths are represented schematically in the drawings, for example as lines, unidirectional arrows, or bidirectional arrows.

At least one hardware processor 504 is coupled with I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor.

Computer system 500 also includes a memory 506 such as a main memory, which is coupled to I/O subsystem 502 for storing information and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a non-volatile memory such as read only memory (ROM) 508 or other static storage device coupled to I/O subsystem 502 for storing static information and instructions for processor 504. The ROM 508 may include various forms of programmable ROM (PROM) such as erasable PROM (EPROM) or electrically erasable PROM (EEPROM). A persistent storage device 510 may include various forms of non-volatile RAM (NVRAM), such as flash memory, or solid-state storage, magnetic disk or optical disk, and may be coupled to I/O subsystem 502 for storing information and instructions.

Computer system 500 may be coupled via I/O subsystem 502 to at least one output device 512 such as a display device. Display 512 may be embodied as, for example, a touch screen display or a light-emitting diode (LED) display or a liquid crystal display (LCD) for displaying information, such as to a computer user. Computer system 500 may include other type(s) of output devices, such as speakers, LED indicators and haptic devices, alternatively or in addition to a display device.

At least one input device 514 is coupled to I/O subsystem 502 for communicating signals, information and command selections to processor 504. Types of input devices 514 include touch screens, microphones, still and video digital cameras, alphanumeric and other keys, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be implemented as a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

Computer system 500 may implement the techniques described herein using customized hard-wired logic, at least one ASIC or FPGA, firmware and/or program logic which in combination with the computer system causes or programs computer system 500 to operate as a special-purpose machine. According to one example, the techniques herein are performed by computer system 500 in response to processor 504 executing at least one sequence of at least one instruction contained in main memory 506. Such instructions may be read into main memory 506 from another storage medium, such as storage device 510. Execution of the sequences of instructions contained in main memory 506 causes processor 504 to perform the process steps described herein. In alternative examples, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage device 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a local network 522 or a public or private cloud on the Internet. For example, communication interface 518 may be an integrated-services digital network (ISDN) card, cable modem, satellite modem, or a modem to provide a data communication connection to a corresponding type of communications line, for example a coaxial cable or a fiber-optic line or a telephone line. As another example, communication interface 518 may include a local area network (LAN) card to provide a data communication connection to a compatible LAN. Wireless links may also be implemented. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, cellular, Wi-Fi, or BLUETOOTH technology. For example, network link 520 may provide a connection through a local network 522 to a host computer 524 or to other computing devices, such as personal computing devices or Internet of Things (IoT) devices and/or data equipment operated by an Internet Service Provider (ISP) 526. ISP 526 provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A method of controlling access to data, the method comprising:
    storing, by a policy engine, one or more policy rules, wherein each policy rule of the one or more policy rules, by reference to at least one class and/or at least one property of one or more classes of a common data model, specifies a corresponding data set within data stored to a data system and specifies whether the corresponding data set is shareable or is not shareable, wherein the common data model defines a knowledge structure for a domain of knowledge of the data stored to the data system;
    receiving, by a policy engine, a data request to access a requested data set stored to the data system, wherein the data request specifies the requested data set using at least one class and/or at least one property of the one or more classes of the common data model;
    applying, by the policy engine, a shareability model to the one or more policy rules to determine a matching policy rule of the one or more policy rules in which at least some of the requested data set is entailed by the corresponding data set specified by the matching policy rule,
    wherein the shareability model includes one or more axioms that each specifies the shareability of a class or property in relation to another class or property; and
    based on the matching policy rule, by the policy engine, outputting a data sharing decision for the data request that indicates whether the at least some of the requested data set is shareable or is not shareable.

2. The method of claim 1, wherein the data sharing decision for the data request comprises a constraint that applies to the requested data set and specifies the at least some of the requested data set that is shareable or is not shareable from the requested data set.

3. The method of claim 2,
    wherein the matching policy rule comprises a policy constraint that applies to a property variable of the at least one property referenced by the matching policy rule,
    wherein the data request triggers the property variable, the method further comprising:
    generating, by the policy engine, the constraint that applies to the requested data set based on the policy constraint and the property variable.

4. The method of claim 3, wherein the policy engine does not apply the policy constraint to the data stored to the data system.

5. The method of claim 3, wherein the at least some of the requested data set that is shareable or not shareable does not include values for the property variable.

6. The method of claim 2, wherein the constraint comprises one of a temporal constraint, an aggregation constraint, a privacy constraint, and a geographical constraint.

7. The method of claim 1,
wherein the data sharing decision comprises expiration information that indicates when the data sharing decision expires,
wherein the at least some of the requested data set is shareable according to the data sharing decision until the data sharing decision expires.

8. The method of claim 7,
wherein the matching policy rule specifies timing information that indicates a valid time window for data sharing decisions based on the matching policy rule, the method further comprising:
generating, by the policy engine, the expiration information based on the timing information of the matching policy rule.

9. The method of claim 1,
wherein the knowledge structure defined by the common data model comprises a domain-specific ontology, and
wherein the one or more axioms of the shareability model comprise one or more domain-independent shareability axioms.

10. The method of claim 1, further comprising:
identifying, by the policy engine, a machine-readable portion of an automated reasoning process that determined the data sharing decision and using a natural language generation model to generate and output a natural language explanation of the machine-readable portion of the automated reasoning process.

11. The method of claim 1,
wherein the corresponding data set includes a first property for a first class of the common data model and a second property for a second class of the common data model, wherein the first property and the second property are joinable by respective relations to one or more other properties of the common data model,
wherein the matching policy rule specifies the corresponding data set by identifying a property of the one or more properties on which the first property and the second property are joined.

12. The method of claim 1,
wherein the matching policy rule references at least two properties that, when joined in a tuple, may be used to uniquely identify an entity, and
wherein the matching policy rule indicates the corresponding data set for the matching policy rule is not shareable.

13. The method of claim 1,
wherein the matching policy rule specifies the corresponding data set using a correlation for two or more properties of the common data model, and
wherein the matching policy rule specifies whether the correlation is shareable or is not shareable.

14. A computing system comprising:
one or more policy rules, wherein each policy rule of the one or more policy rules, by reference to at least one class and/or at least one property of one or more classes of a common data model, specifies a corresponding data set within data stored to a data system and specifies whether the corresponding data set is shareable or is not shareable,
wherein the common data model defines a knowledge structure for a domain of knowledge of the data stored to the data system;
a policy engine comprising processing circuitry coupled to a memory storing instructions,
wherein the policy engine is configured to receive a data request to access a requested data set stored to the data system, wherein the data request specifies the requested data set using at least one class and/or at least one property of the one or more classes of the common data model,
wherein the policy engine is configured to apply a shareability model to the one or more policy rules to determine a matching policy rule of the one or more policy rules in which at least some of the requested data set is entailed by the corresponding data set specified by the matching policy rule,
wherein the shareability model includes one or more axioms that each specifies the shareability of a class or property in relation to another class or property, and
wherein the policy engine is configured to, based on the matching policy rule, output a data sharing decision for the data request that indicates whether the at least some of the requested data set is shareable or is not shareable.

15. The computing system of claim 14,
wherein the data sharing decision for the data request comprises a constraint that applies to the requested data set and specifies the at least some of the requested data set that is shareable or is not shareable from the requested data set.

16. The computing system of claim 15,
wherein the matching policy rule comprises a policy constraint that applies to a property variable of the at least one property referenced by the matching policy rule,
wherein the data request triggers the property variable,
wherein the policy engine is configured to generate the constraint that applies to the requested data set based on the policy constraint and the property variable.

17. The computing system of claim 15, wherein the policy engine is not configured to apply the policy constraint to the data stored to the data system.

18. The computing system of claim 17, wherein the at least some of the requested data set that is shareable or not shareable does not include values for the property variable.

19. The computing system of claim 15, wherein the constraint comprises one of a temporal constraint, an aggregation constraint, a privacy constraint, and a geographical constraint.

20. A non-transitory computer-readable storage medium comprising instructions which, when executed by one or more processors, cause a computing system to perform operations comprising:
storing one or more policy rules, wherein each policy rule of the one or more policy rules, by reference to at least one class and/or at least one property of one or more classes of a common data model, specifies a corresponding data set within data stored to a data system and specifies whether the corresponding data set is shareable or is not shareable,
wherein the common data model defines a knowledge structure for a domain of knowledge of the data stored to the data system;
receiving a data request to access a requested data set stored to the data system, wherein the data request specifies the requested data set using at least one class and/or at least one property of the one or more classes of the common data model;
applying a shareability model to the one or more policy rules to determine a matching policy rule of the one or more policy rules in which at least some of the requested data set is entailed by the corresponding data set specified by the matching policy rule,
wherein the shareability model includes one or more axioms that each specifies the shareability of a class or property in relation to another class or property; and
based on the matching policy rule, outputting a data sharing decision for the data request that indicates whether the at least some of the requested data set is shareable or is not shareable.

* * * * *